United States Patent
Magnone et al.

(10) Patent No.: US 10,099,076 B2
(45) Date of Patent: *Oct. 16, 2018

(54) FIRE PROTECTION DEVICE AND METHOD FOR FIRE PROTECTION OF AN INDUSTRIAL OIL COOKER

(71) Applicant: Tyco Fire Products LP, Lansdale, PA (US)

(72) Inventors: Zachary L. Magnone, Warwick, RI (US); Jose L. Almeida, Warwick, RI (US); Thomas W. Bowder, Jr., Scituate, RI (US); Chad A. Goyette, Tiverton, RI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,048

(22) Filed: Oct. 4, 2017

(65) Prior Publication Data

US 2018/0028849 A1 Feb. 1, 2018

Related U.S. Application Data

(63) Continuation of application No. 14/687,780, filed on Apr. 15, 2015, now Pat. No. 9,782,612, which is a
(Continued)

(51) Int. Cl.
*A62C 3/00* (2006.01)
*A62C 31/02* (2006.01)
(Continued)

(52) U.S. Cl.
CPC .......... *A62C 3/006* (2013.01); *A47J 37/1271* (2013.01); *A47J 37/1276* (2013.01);
(Continued)

(58) Field of Classification Search
CPC .......... A62C 3/006; A62C 3/06; A62C 3/065; A62C 31/005; A62C 31/02; B05B 1/26; B05B 1/262; B05B 1/265
See application file for complete search history.

(56) References Cited

U.S. PATENT DOCUMENTS 2,553,726 A * 5/1951 Rowley .................. A62C 37/12
169/38
4,356,870 A 11/1982 Gaylord et al.
(Continued)

FOREIGN PATENT DOCUMENTS

SU 643162 A1 1/1979
WO WO 98/39065 9/1998
(Continued)

OTHER PUBLICATIONS

Tyco Fire Suppression & Building Products, Type IFP AQUAMIST Fire Suppression System Industrial Fryer Protection Datasheet, TFP2240, Oct. 2013,18 pp.
(Continued)

*Primary Examiner* — Ryan A Reis
(74) *Attorney, Agent, or Firm* — Foley & Lardner LLP (57) ABSTRACT

Fire protection mist nozzles for industrial oil cookers, oil cookers with fire protection systems, and method of oil cooker fire protection are provided. The mist nozzles operate at pressures between 170 and 250 psi, and provide a unique distribution pattern that allows for variable installations for protection in certain operative environments including oil cookers with various hood configurations. The fire protection nozzles includes a base defining an inlet and an outlet along an axis. The base includes an orifice having an inlet diameter and an outlet diameter. The outlet diameter is preferably greater than the inlet diameter; and the orifice defines a K-factor of less than 1.0 gpm/psi½. The nozzle includes a diffuser aligned with the orifice. The diffuser has
(Continued)

a preferably substantially domed portion with a maximum diameter that is less than the summation of the inlet diameter and the outlet diameter of the orifice.

5 Claims, 4 Drawing Sheets

Related U.S. Application Data continuation of application No. 14/314,961, filed on Jun. 25, 2014, now Pat. No. 9,205,290, which is a continuation of application No. PCT/US2014/030800, filed on Mar. 17, 2014.

(60) Provisional application No. 61/801,384, filed on Mar. 15, 2013.

(51) Int. Cl.
B05B 1/26 (2006.01)
A62C 99/00 (2010.01)
A47J 37/12 (2006.01)
A62C 31/00 (2006.01)

(52) U.S. Cl.
CPC ............ *A62C 31/005* (2013.01); *A62C 31/02* (2013.01); *A62C 99/0072* (2013.01); *B05B 1/265* (2013.01)

(56) References Cited

U.S. PATENT DOCUMENTS

| | | | |
|---|---|---|---|
| 4,511,003 A * | 4/1985 | Randall | A62C 37/12 169/38 |
| 4,800,961 A * | 1/1989 | Klein | A62C 37/10 169/37 |
| 4,813,487 A | 3/1989 | Mikulec | |
| 4,830,116 A | 5/1989 | Walden | |
| 5,195,592 A | 3/1993 | Fishcer | |
| 5,392,993 A * | 2/1995 | Fischer | A62C 31/02 169/38 |
| 5,505,383 A * | 4/1996 | Fischer | A62C 31/02 169/37 |
| 5,628,368 A | 5/1997 | Sundholm | |
| 5,829,684 A | 11/1998 | Fishcer | |
| 5,839,667 A | 11/1998 | Fishcer | |
| 6,173,791 B1 | 1/2001 | Yen | |
| 6,454,017 B1 | 9/2002 | Fischer et al. | |
| 6,510,901 B2 | 1/2003 | Yen | |
| 7,096,964 B2 * | 8/2006 | Dushkin | A62C 31/02 169/37 |
| 7,789,165 B1 | 9/2010 | Yen | |
| 9,205,290 B2 * | 12/2015 | Magnone | A62C 31/02 |
| 9,782,612 B2 * | 10/2017 | Magnone | A62C 3/006 |
| 2011/0315406 A1 * | 12/2011 | Connery | A62C 37/14 169/16 |

FOREIGN PATENT DOCUMENTS

| | | |
|---|---|---|
| WO | WO 01/72375 | 10/2001 |
| WO | WO 2008/092454 | 8/2008 |

OTHER PUBLICATIONS

Tyco Fire Suppression & Building Products, Type AM31 AQUAMIST Nozzle Non-Automatic (Open) Datasheet, TFP2202, Sep. 2013, 2 pp.

Tyco Fire Suppression & Building Products, Type IFP AQUAMIST Recessed Nozzle Fittings Industrial Fryer Protection Datasheet, TFP2242, Oct. 2013, 4 pp.

Tyco Fire Suppression & Building Products, AquaMist Nozzles Type AM4, Non-Automatic (Open) Datasheet, TFP2204, Oct. 2013, 2 pp.

Tyco Fire Suppression & Building Products, Type AM10 and AM10B AQUAMIST Nozzles Non-Automatic (Open) Datasheet, TFP2210, Oct. 2013, 2 pp.

Marioff Corporation Oy, Hi-Fog Water Mist Fire Protection Product Brochure, Hi-Fog for the Food Industry, 2010, 2 pages.

Nam, Soonil, FM Global Research, Application of Water Sprays to Industrial Oil Cooker Fire, 7th Intl. Symposium on Fire Safety Science, 2002, pp. 469-480.

Factory Mutual, FM Global, FM Approvals, Approval Guide for CAFS Unit MistShield Water Mist Deluge Sys for the . . . of Oil Cookers, 2007-2014, 2 pages.

Factory Mutual, FM Global, FM Approvals, Approval Guide for Marioff Corp. Oy, Hi-Fog System for the Protection of Oil Cookers, 2007-2014, 2 pages.

Liu, Z. et al., National Research Council Canada, NRCC-46970, Exting. of Large Cooking Oil Pool Fires by Use . . . Systems, Combust Inst Spring Tech Mtg, May 9-12, 2005. 7 pages.

Liu, Z. et al., National Research Council Canada, NRCC-48139, Characteristics of Large Cooking Oil Pool Fires . . . By Water Mist, Journal of Loss Prevent in Process Ind, vol. 19.

Factory Mutual, FM Global, FM Approvals, Approval Guide for AQUAMIST Type Indust Fryer Protect (IFP) Fire Supp Sys for the Protect of Ind Oil Cookers, 2007-2014, 2 pages.

Factory Mutual, FM Global Property Loss Prevention Datasheets, 7-20, Apr. 2014, 13 pages.

CAFS Unit Home Web page and MistShield Water Mist Datasheet, 1997,4 pages; http://www.cafsunitw.com/Water-mist-fire-protection-system.php.

Factory Mutual (FM) Global Technologies LLC, Approval Standard for Water Mist Systems: Case No. 5560, Nov. 2012, 282 pages.

Marioff Corportation Oy, Hi-Fog Water Mist Fire Protection Product Brochure, 2011, 8 pages.

Grinnell Corporation, Datasheet, AquaMist,. Total Compartment Deluge System. Type AM10 AquaMist Open Nozzles . . . Hazards, TD1174, Nov. 1997.

Grinnell Corporation, Dataseheet, AquaMist,. Total Compartment Deluge System. Type AM4 AquaMist Open Nozzles . . . Hazards, TD1173, Jun. 1998, 8 pages.

Tyco Fire Suppression & Building Products, AquaMist Nozzles Type AM4, Non Automatic (Open) Datasheet. TFP2204, Apr. 2009, 4pp.

Grinnell Corportation Datasheet, Aquamist Marine System, Per IMO . . . Fire Protection, Detection and Alarm, TD1170, Mar. 1997, 34 pages.

U.S. Appl. No. 61/801,384, filed Mar. 15, 2013.

International Search Report and Written Opinion, International Patent Application No. PCT/US2014/03080, filed Mar. 17, 2014, 30 pages.

IFW, European Patent Application No. EP14722898.5, Jul. 10, 2017, 268 pages.

\* cited by examiner

FIRE PROTECTION DEVICE AND METHOD FOR FIRE PROTECTION OF AN INDUSTRIAL OIL COOKER

CROSS REFERENCE TO RELATED APPLICATIONS

This application is a continuation application of U.S. patent application Ser. No. 14/687,780 filed Apr. 15, 2015; which is a continuation application of U.S. patent application Ser. No. 14/314,961 filed Jun. 25, 2014 (now U.S. Pat. No. 9,205,290); which is a continuation application of International Application No. PCT/US2014/030800, filed Mar. 17, 2014; which claims the benefit of priority to U.S. Provisional Application No. 61/801,384, filed Mar. 15, 2013, all of which are incorporated herein by reference in their entirety.

FIELD OF INVENTION

This invention relates generally to fire suppression devices such as water mist nozzles, and methods of installing such nozzles for protection from fires. More specifically, the invention is directed to fire suppression nozzles and methods for the suppression of fires in industrial oil cookers or otherwise known as industrial oil fryers.

BACKGROUND OF THE INVENTION

A fire protection system for an industrial oil cooker is shown and described in U.S. Pat. No. 7,789,165. The '165 patent provides an oil cooker that has a longitudinally elongated cooker pan, a longitudinally elongated hood directly above the pan; and mist producing nozzles that are piped and disposed beneath the top wall of the hood and above the pan of oil. To assure mist suppression of flames or combustion on the oil surface, the height of the hood above the oil is selected and moved to an appropriate height above the pan. The '165 patent describes a method and system of fire protection in which a mist stream is formed at each nozzle at a water pressure of between, 50 and 1,500 psi and preferably above 260 psi. To accomplish this protection scheme, the nozzles are spaced with a rectangular surface zone of oil below each nozzle, and centered above each zone such that the mist is propelled downward to diverge and impinge on the oil surface to cover the oil in its respective rectangular surface zone. The nozzles may be carried by the top wall of the hood so as to project through a surface of the top wall. The hood is provided with a hood vent that has a mist nozzle disposed on a vertically extending wall of the hood vent. The vent nozzle can be angulated by a provision to cause the mist to be propelled in a selected lateral or longitudinal direction. Although the system of fire protection of the '165 patent provides a fire protection approach for an industrial oil cooker at a range of operative pressures between 50 and 1500 psi, the system is shown and described as being applicable to hoods and exhaust vents of a particular configuration, e.g. being either vertical or horizontal with respect to the oil surface, and instructs that the hood should be moved in a vertical manner to ensure appropriate coverage of the oil surface by the nozzles instead of identifying a particular nozzle spray pattern to be utilized for the protection of an industrial oil cooker. Due to the failure of the '165 patent to specify an appropriate mist pattern for addressing a fire in the oil of an industrial oil cooker, the fire protection system of the '165 patent fails to address industrial oil cookers that have their hood surface in a fixed positions with respect to the oil surface, e.g., regardless if the hood surface is parallel to the oil surface or angled to the oil surface.

While various mist nozzles are known in the art that operate in the pressure ranges specified by the '165 patent; the inventors have discovered that the structural configuration of these nozzles is insufficient to provide a spray pattern that addresses the deficiency of the fire protection system of the '165 patent with a nozzle having a minimum operating pressure to be considered a low or medium pressure system. The structural details of known fire protection sprinkler nozzles are shown and described in each of U.S. Pat. Nos. 5,392,993; 5,505,383 and 5,829,684 and U.S. Patent Publication No. 20110315406. Each of these nozzles has a specific orifice and diffuser configuration, i.e. an orifice insert which defines the orifice that has an inlet diameter that is equal to or greater than the outlet diameter of the insert, and an axially aligned diffuser that is larger than the orifice. Thus, a mist nozzle configuration is needed that will allow for operation at commercially desirable pressures and with various hood configurations of industrial oil cookers.

SUMMARY OF THE INVENTION

Preferred embodiments of a fire protection nozzle for industrial oil cookers, oil cookers with a fire protection system, and methods of oil cooker fire protection are provided. The preferred embodiments of a mist nozzle operate at pressures preferably between 170 and 250 psi, and provide a unique distribution pattern that allows for variable installations for protection in certain operative environments such as industrial oil fryers.

One preferred embodiment of a fire protection nozzle includes a base defining an inlet and an outlet along an axis. The base includes an orifice having an inlet diameter and an outlet diameter. The outlet diameter is preferably greater than the inlet diameter; and the orifice defines a K-factor of less than 1.0 gpm/psi½. The nozzle includes a diffuser aligned with the orifice. The diffuser has a preferably substantially domed portion with a maximum diameter that is less than the summation of the inlet diameter and the outlet diameter of the orifice.

In one preferred embodiment, the orifice is defined by an orifice member having a surface substantially perpendicular to the axis and exposed to the inlet. The surface defines a first area and the inlet diameter defines a second area with the first area being greater than the second area. The orifice preferably includes a tapering wall between the inlet diameter and the outlet diameter that preferably tapers away from and along the axis. In one preferred aspect, the ratio of the first area to the second area is approximately 5:1. In another preferred aspect, the inlet diameter and the outlet diameter are spaced along the axis to define a length of the orifice member, the first area defines a diameter of the orifice member that is greater than the length of the orifice member. More preferably, the ratio of the diameter of the orifice member to the length of the orifice member is approximately 5:1.

In one preferred embodiment of the orifice member where the surface substantially perpendicular to the axis and exposed to the inlet defines a first surface, the orifice member further preferably includes a second surface that surrounds, extends along and is substantially parallel to the axis adjacent the first surface to define a first sharp edge. A third surface surrounds, extends along and preferably tapers away from and along the axis adjacent the second surface to define a second sharp edge. A fourth surface substantially perpendicular to the axis and exposed to the outlet adjacent the third surface define a third sharp edge. In one preferred aspect, the first and second surfaces define the first sharp edge disposed at approximately 90 degrees relative to each other. The second and third surfaces defining the second sharp edge are preferably disposed at approximately 150 degrees relative to each other; and the third and fourth surfaces defining the third sharp edge are preferably disposed at approximately 120 degrees relative to each other.

In a preferred embodiment of the nozzle, the orifice has a cylindrical wall adjacent a frusto-conical wall to define the orifice. The cylindrical wall preferably terminates at an inlet surface of the orifice to define an inlet edge that is approximately 90 degrees between the inlet surface and the cylindrical wall. The cylindrical wall and the adjacent frusto-conical wall preferably meet at a transition edge within the orifice with approximately 150 degrees between the cylindrical wall and the frusto-conical wall. The cylindrical wall and the frusto-conical wall define a preferred length of the orifice along the axis and the frusto-conical surface defines a preferred cone angle of approximately 60 degrees.

In one preferred embodiment of the nozzle, the diffuser is aligned with the orifice and provides a fluid distribution of fluid flowing from the orifice to a coverage area. The preferred coverage area has a first area defining 16 square feet and a second area defining 20 square feet circumscribing the first area. The first area preferably receives approximately 60-70% of the fluid distribution from the nozzle and the second area preferably receives approximately 30-40% of the fluid distribution from the nozzle. The preferred distribution provides: (1) at least 0.080 gallons per minute per square foot to the coverage area; (2) at least 0.120 gallons per minute per square foot to the first area of the coverage area; (3) at least 0.040 gallons per minute per square foot to the second area of the coverage area; and (4) at least 0.080 gallons per minute per square foot to each square for the first area of the coverage area. In one preferred aspect, the first area receives approximately 65% of the fluid distribution from the nozzle and the second area receives approximately 35% of the fluid distribution from the nozzle. The maximum diameter of the substantially domed portion is preferably about 0.3 inches; and a tip portion of the substantial domed portion is disposed at a distance from the outlet diameter ranging from approximately 1.1 to 1.3 inches.

A preferred method of fire protection for an industrial oil cooker is provided. The method includes providing at least one fire protection nozzle including a base having an orifice defining an inlet diameter and an outlet diameter and a diffuser having a substantially domed portion with a maximum diameter being less than the summation of the inlet diameter and the outlet diameter of the orifice. The preferred method includes mounting the at least one nozzle to an angled hood surface of an oil cooker disposed above a pan of oil that defines an oil surface the at least one nozzle being directly mounted such that axis is perpendicular to the angled hood surface. The preferred method further includes supplying a fluid to the two nozzles at pressure ranging from 170 psi to 250 psi such that the diffuser provides a fluid distribution of the fluid flowing from the orifice to a coverage area having a preferred first area defining 16 square feet and a preferred second area defining 20 square feet circumscribing the first area. The first area preferably receives approximately 60-70% of the fluid distribution from the nozzle and the second area receives approximately 30-40% of the fluid distribution from the nozzle. The fluid being distributed preferably provides: (1) at least 0.080 gallons per minute per square foot to the coverage area; (2) at least 0.120 gallons per minute per square foot to the first area of the coverage area; (3) at least 0.040 gallons per minute per square foot to the second area of the coverage area; and (4) at least 0.080 gallons per minute per square foot to each square for the first area of the coverage area.

Accordingly, a preferred embodiment of an industrial oil cooker is provided. The cooker preferably includes a pan of oil to define an oil surface; a hood disposed over the oil that includes a hood surface disposed at a fixed height over the oil surface. The hood may be parallel to the oil surface or may have angled portions relative to the oil surface. In one preferred embodiment, the hood surface includes an angled hood surface. At least one fire protection nozzle having an orifice defining a nozzle axis is mounted to the hood surface such that the nozzle axis is perpendicular to the surface. In embodiments where the hood surface is angled, the hood surface is angled at an angle greater than zero and preferably a maximum of at least fifteen degrees with respect to the oil surface. The at least one fire protection nozzle includes two fire protection nozzles, and the angled hood surface has a first portion and a second portion. One nozzle is disposed on the first portion, and the other nozzle being disposed on the second portion. The oil pan defines a lateral width and a lateral length in which the at least one nozzle includes a plurality of nozzles spaced along the lateral length. Moreover, the plurality of nozzles include pairs of nozzles spaced along on the lateral length preferably based on the effective spray angle of the nozzle. The preferred oil cooker includes a side-wall disposed perpendicular to the oil surface, the nozzle being disposed from the side-wall at a lateral distance of up to 24 inches. The oil pan defines a lateral width preferably ranging from 48 inches to about 96 inches. One preferred embodiment of the oil cooker further includes a link member disposed about the nozzle remains in a fixed orientation with respect to the nozzle axis; a protective cap engaged with the nozzle to protect the nozzle; and a chain coupling the protective cap to the link member. Another preferred embodiment of the oil cooker includes a fluid supplied at a pressure of 170 to 250 psi to the nozzle. The nozzle has a preferred coverage area including a first area defining 16 square feet and a second area defining 20 square feet circumscribing the first area distributed with the nozzle distributing the fluid to provide: (1) at least 0.090 gallons per minute per square foot to the coverage area; (2) at least 0.130 gallons per minute per square foot to the first area of the coverage area; (3) at least 0.050 gallons per minute per square foot to the second area of the coverage area; and (4) at least 0.080 gallons per minute per square foot to each square for the first area of the coverage area.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

Figure 1:
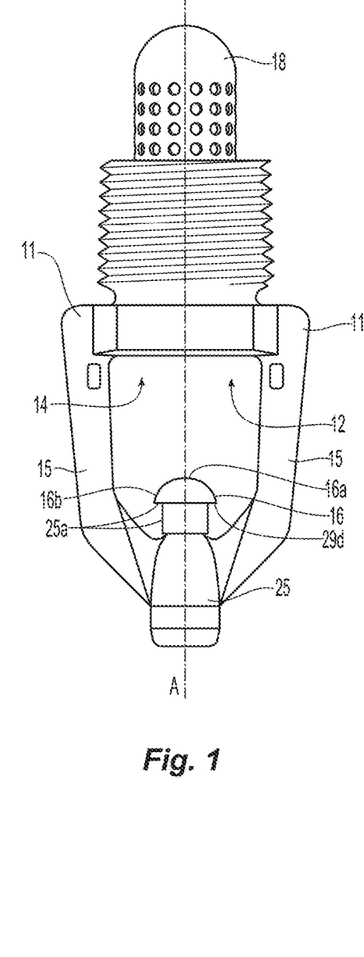
FIG. 1 is a plan view of a preferred embodiment of an inner base member of a nozzle.
Figure 2:
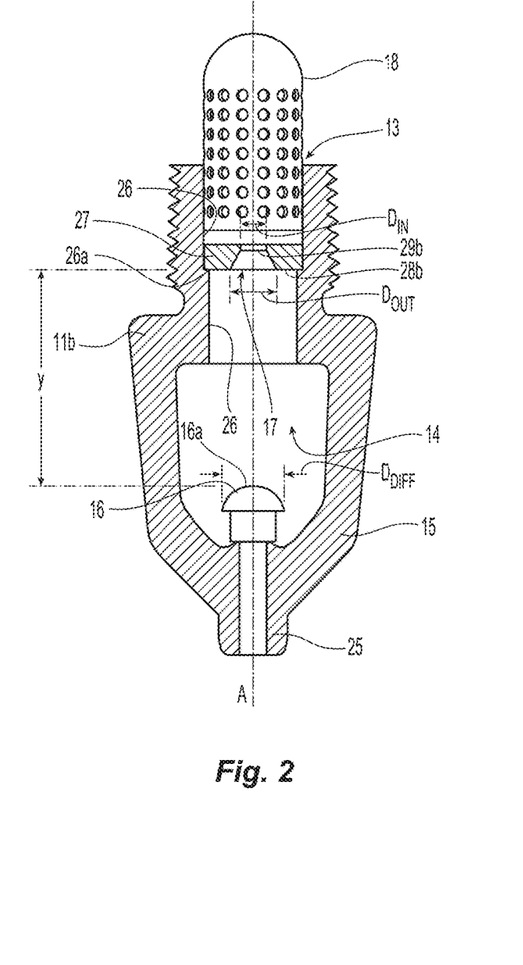
FIG. 2 is a cross-sectional view of the nozzle of FIG. 1.

Referring to FIGS. 1 and 2, the invention provides a fire protection nozzle 10 having a base 11 with a passage 12 through which a fire-fighting fluid is delivered to a protected or coverage area. The passage 12 extends along a central axis A-A between an upstream inlet 13 of the nozzle that connects to a fire-fighting fluid supply system and a downstream outlet 14 of the nozzle that delivers the fluid to the coverage area. The base has arms 15 that extend downstream where they converge to provide support for a diffuser 16 positioned to receive a flow of the fluid exiting the outlet 14 to disperse the flow in a dispersal pattern to the coverage area. The passage 12 includes an orifice 17 that controls the delivery of the fluid through the passage, preferably providing a K-factor of less than 1.0 gpm/psi½ and, more preferably, providing a K-factor of about 0.3 gpm/psi½. As used herein, the K-factor is defined as a constant representing the sprinkler discharge coefficient, that is quantified by the flow of fluid in gallons per minute (GPM) from the sprinkler outlet divided by the square root of the pressure of the flow of fluid fed into the inlet of the sprinkler passageway in pounds per square inch (PSI). The K-factor is expressed as $GPM/(PSI)^{1/2}$. The nozzle 10 also includes an inlet screen 18 to protect the nozzle from debris in the fire-fighting fluid delivered to the nozzle by the supply system.

Figure 5A:
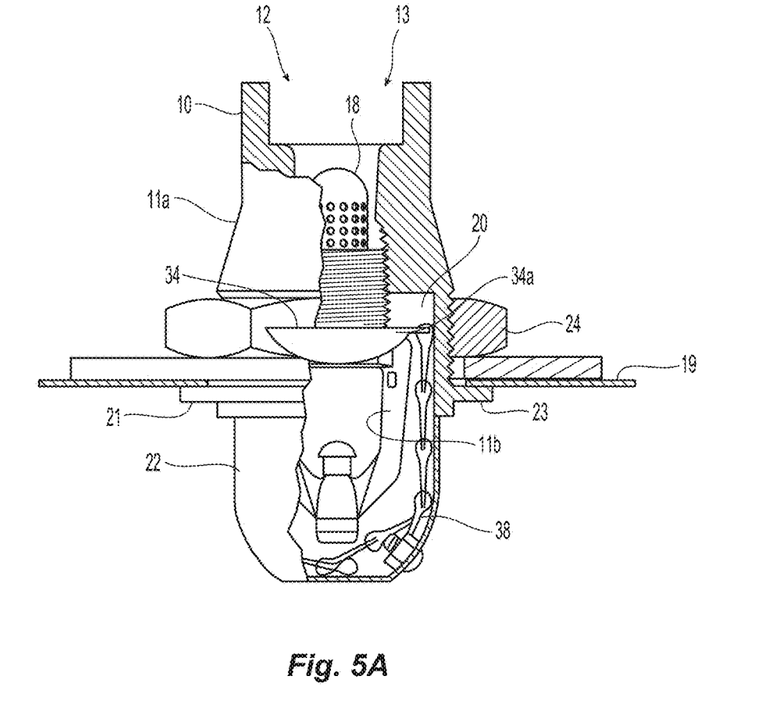
FIG. 5A is a partial cross-sectional side view of a preferred embodiment of an installation of a nozzle.
Figure 5B:
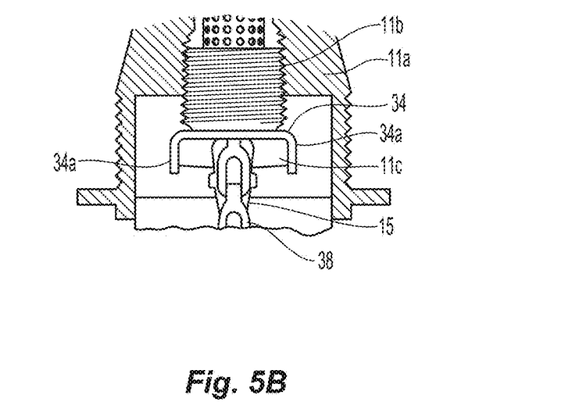
FIG. 5B is a partial cross-sectional view of the installation of FIG. 5A.

Referring to FIGS. 1 and 5, the nozzle base 11 can be a unitary construction or, as illustrated, a multi-piece design having an outer base member 11a supporting an inner base member 11b. The outer base member 11a provides an external surface for connection to the fluid supply system at the nozzle inlet 13 and for connection to an installation structure, such as a top wall 19 of an oil fryer, to secure the nozzle relative to the coverage area. The outer base member 11a also provides a port 20 into which the inner base member 11b can be inserted and connected to the fire-fighting fluid supply system, and optionally provides a releasable mounting 21 for a protective cap 22 covering the portions of the system that are exposed to the coverage area when the system is activated.

In a preferred embodiment, the inlet of the outer base member 11a provides a connection to the fire-fighting fluid supply system and is preferably a socket into which a pipe of the supply system is inserted and secured with, for example, a weld. The outlet of the outer base member preferably has an opening sized to receive the protective cap 22. The sides of the outer base member preferably have a flange 23 configured to abut the wall 19 with the outer base member 11a inserted through the hole of the wall 19. The outer base member includes threads that receive a nut 24 that is positioned to oppose the flange 23, so that the tightening of the nut compressed the nut and flange against the wall to secure the outer base member to the wall. After the outer base member is installed onto the wall, and the inlet of the outer base member is connected to the fire-fighting fluid supply system, the outer base member 11a presents to the coverage area a recess 20 with a threaded port that leads through the nozzle 10 to the piping connected to the inlet end 13 of the outer base member 11a. Into that recess and the threaded port 20 the inner base member can be installed by, preferably, screwing the inner base member 11b into the threaded port 20. The inner base member can engage the threaded port with NPT threads or with straight threads in combination with a sealant.

The inner base member 11b provides a portion of the passage 12 through the nozzle 10, support for the screen 18 and an orifice member, and support for the arms 15 and the diffuser 16. The inner base member 11b preferably has a cylindrical base with threading on its exterior configured for insertion into the outer base member. The passage extends through the cylindrical base from an inlet of the inner base member to an outlet, preferably disposed so that the inner base member inlet and outlet are both between the inlet and outlet of the outer base member along the central axis A-A. At the outlet of the inner base member two frame arms 15 preferably extend from opposing sides of the outlet and through the outlet of the outer base member to converge at a support 25 preferably disposed along the central axis A-A to place the diffuser 16 in position to face the outlet 14.

Referring to FIG. 2, at the inlet 13 of the inner base member 11b, the passage 12 through the inner base member 11b has an interior wall 26 that defines a step 26a where the inner diameter of the passage changes from a first diameter at approximately the axial middle of the passage 12 to a second greater diameter at the inlet end 13 of the passage 12. In the portion of the passage having the second diameter are disposed the screen 18 positioned to extend from the inlet of the inner base member, and a orifice member 27 disposed entirely within the passage 12 between the screen 18 and the step 26a provided by the interior wall 26 defining a portion of the passage 12 passing through the inner base member 11b. Preferably, the orifice member 27 is held in position within the passage 12 because it is pressed between the screen 18 and the step 26a.

Figure 3:
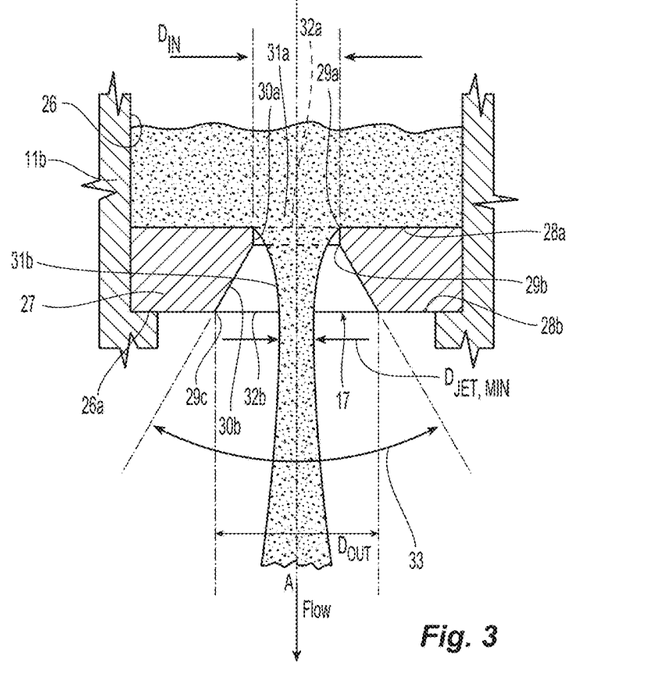
FIG. 3 is a cross-sectional view of a preferred embodiment of the inner base member of FIG. 1 in an operational mode.

The orifice member 27 provides the orifice and controls the shape and direction of the flow exiting the nozzle and impacting the diffuser. Referring to FIGS. 2 and 3, the orifice member 27 provides at least two surfaces at the inlet 13 and outlet 14 ends of the orifice. The inlet surface 28a provides an initial restriction of the flow through the orifice 17, with the restriction defined by a sharp corner edge 29a at the beginning of the inlet 13. The inlet surface 28a continues through the orifice member with a straight cylindrical wall 30a that leads the flow to the outlet surface 28b after crossing an internal transition 29b between the inlet and outlet surfaces 28a, 28b within the orifice member 27. The transition 29b is a defined area where the inlet and outlet surfaces 28a, 28b meet and where the straight cylindrical wall 30a terminates and then diverges away from the central axis A-A to provide the outlet surface 28b. The outlet surface 28b diverges away from the axis A-A to provide an expansion of the orifice as the flow is passing through the orifice. The outlet surface 28b continues to diverge away until reaching the end of the downstream of the orifice. Referring to FIG. 3, it is believed that the immediate diverging of the walls of the orifice at the transition provides shape to and assists with control of the flow through the nozzle. Prior to the reaching the transition, the flow assumes a supported columnar shape 31a that is defined by the contact between the flow and the cylindrical inlet surface 28a. At the transition 29b, the orifice wall diverges away from the column leaving the column unsupported by adjacent structure. As the flow enters the expanding outlet surface, preferably having an expanding frusto-conical shape, the column continues as an unsupported column 31b that narrows as the flow travels to the diffuser 16. It is believed that the narrowing of the flow and the absence of friction from the outlet surfaces 28b helps to increase the velocity of the flow prior to the flow impacting the diffuser 16. It is further believed that an increased velocity to the flow assists with the formation of a desired dispersal pattern.

As illustrated in FIGS. 2 and 3, the orifice member 27 is preferably a cylindrical insert placed within the passage 12 of the inner base member 11*b* of the nozzle. The orifice member 27 is preferably disc shaped with an outer diameter of approximately 0.5 inches and a thickness or length along the central axis of approximately 0.125 inches. Alternatively, the orifice member can be a composite of components, such as a stacking of thin discs that together provide an orifice member with the preferable thickness. The orifice member has an upstream surface that faces the flow coming through the inlet of the nozzle and a downstream surface facing towards the diffuser. The upstream surface 28*a* provides a circular opening 32*a* that leads to a cylindrical wall 30*a*, which then leads to a variable wall 30*b* that tapers outwardly away from the central axis A-A until meeting another opening 32*b* at the downstream surface 28*b*. A transition edge 29*b* is disposed between the upstream or inlet surface 28*a* and the downstream or outlet surface 28*b*. The inlet 32*a* preferably has a diameter $D_{IN}$ of 0.13 inches and extends through the orifice for approximately 0.025 inches. The outlet surface preferably 30*b* has a frusto-conical shape that has a cone angle 33 of 60 degrees that expands until meeting the downstream opening 32*b*, and preferably has an outlet 32*b* at the downstream surface that has a diameter $D_{OUT}$ of approximately 0.3 inches and, more preferably, 0.246 inches. The nozzle 10 presents the diffuser 16 with a diffuser tip 16*a* that is placed at a defined distance based on the length of the frame arms 15. Preferably, the distance Y between the diffuser tip 16*a* and the downstream surface 28*b* of the orifice member is 1.1-1.3 inches. Also preferable is that the spacing between the transition 29*b* and the diffuser tip 16*a* is 1.2-1.4 inches.

The orifice member preferably defines a series of edges along the length of the orifice. Preferably, the upstream surface 28*a* provides a circular opening 32*a* that leads to the cylindrical wall 30*a* to define a first edge 29*a* between the upstream-facing portion of the upstream surface 28*a* and the cylindrical wall 30*a*, with the first edge 29*a* preferably being a sharp edge that provides a 90 degree angle between a portion of the upstream surface 28*a* and the cylindrical wall 30*a*. At the downstream end of the cylindrical wall, the surface of the orifice transitions to the variable wall 30*b* that tapers outwardly away from the central axis A-A. Preferably, the transition between the cylindrical and variable walls 30*a*, 30*b* defines a second edge 29*b* at the transition where the cylindrical wall 30*a*, which is parallel to the central axis A-A, changes to the variable wall 30*b*, which is disposed at an angle to the central axis A-A. More preferably, the transition 29*b* is a sharp edge that provides a 150 degree angle between the vertical of the cylindrical wall 30*a* and the variable walls 30*b*. Also preferable is that the variable wall 30*b* has a frusto-conical shape with a narrow end and a wide end of the frusto-conical shape positioned so that the narrow end abuts the cylindrical wall to provide a circular second edge 29*b* and, more preferably, the frusto-conical shape defines a cone angle 33 of 60 degrees. At the downstream end of the variable wall 30*b*, the variable wall terminates where it meets a downstream-facing portion of the downstream surface 28*b* of the orifice member to define a third edge 29*c* where the variable wall, which has a surface that is not perpendicular to the central axis A-A, meets a portion of the downstream surface 28*b*, which has a perpendicular surface to the central axis A-A. The variable wall also preferably extends along the central axis for approximately 0.1 inches and provides an orifice outlet 32*b* diameter $D_{OUT}$ of approximately 0.25 inches. Preferably the third edge 29*c* is a sharp edge that provides a 120 degree angle between the variable wall 30*b* and the downstream surface 28*b*. In alternative embodiments, the variable wall 30*b* can diverge or fall away from the central axis A-A by providing a curvature or an undulation that generally moves away from the central axis. In another alternative, the variable wall can extend the entire length of the orifice so as to have no cylindrical wall. The curvature or undulation can be in the direction of the central axis or about the central axis, or in a combination of the two. Also, the second and third edges 29*b*, 29*c* can vary so as to provide a non-circular shape about the central axis, such as an oval or another shape that provides a transition between mating surfaces. Likewise, one or both of the two internal surfaces 30*a*, 30*b* can have a curvature so that the second and third edges 29*b*, 29*c* are formed by the mating of two curved surfaces, or by the mating of a curved surface with an axially-linear surface. In an alternative embodiment, the orifice member can be formed of a composite of multiple discs stacked together to provide an orifice member of sufficient thickness, with at least some of the inner orifices of the stacked discs providing different inner diameters to form, together, a composite inner surface with a desired curvature or pattern of stepped surfaces that provide a cylindrical, sloping, stepped, or conical-like inner surface to the orifice member.

The diffuser 16 preferably has a surface facing the nozzle outlet 14 that is substantially spherical or substantially domed or hemispherical with a support surface holding the diffuser in position on the central axis to receive a flow of the fire-fighting fluid. The diffuser 16 with the dome or hemispherical surface preferably has a center of the dome or hemispherical surface disposed on the central axis A-A to face the orifice member 27 so as to define an outer peripheral edge 16*b* of the diffuser 16 where the dome or hemispherical surface stops and meets the support surface 25*a*. Preferably, the domed or hemispherical surface and the support surface 25*a* meet to define a fourth edge 29*d* that has a circular profile about the axis A-A along the periphery of the domed or hemispherical surface. More preferably, the fourth edge 29*d* is a sharp edge with the domed or hemispherical surface at its periphery and with the support surface disposed to be perpendicular to the central axis so that the fourth edge approximates a substantially 90 degree angle between the domed/hemispherical and support surfaces. In the embodiment with the spherical diffuser 16, the outer peripheral edge of the diffuser 16*b* can be at the maximum diameter of the diffuser $D_{DIFF}$ taken on a bisecting plane that is perpendicular to the central axis A-A. The outer peripheral edge preferably provides a diffuser maximum diameter of approximately 0.31 inches. Preferably, the diffuser maximum diameter is less than the summation of the inlet and outer diameters $D_{IN}$, $D_{OUT}$ of the orifice.

When installed, the nozzle can include an protective cap that can be ejected but remain secured to the nozzle. As illustrated in FIGS. 5A and 5B, the outlet end 14 of the inner base member 11*b* preferably supports a link member 34 that is an annular member with an inner diameter and an outer diameter. The link member 34 inner diameter is sized so that the link member can be slid over the external threading of the inner base member into position adjacent to where the frame arms 15 extend from the inner base member, adjacent to a wrench fitting portion 11*c* of the inner base member that provides two opposing surfaces configured to receive a wrench when a wrench is used to screw the inner base member into the outer base member. The link member has two bent sides 34a that are formed by the bending of the annular member so that the two bent sides are parallel and oppose each other about the central axis. The bent sides 34a are positioned so that the link member can fit over the wrench fitting portion, so as to prevent the link member from rotating about the central axis. A peripheral portion 34b of the link member that is not bent is disposed adjacent to a frame arm to support a chain 38 (at a connection point 34c) that is disposed to hang along the side of the frame arm when the chain is allowed to fall. The end of the chain 38 preferably connects to the inside of the protective cap 22 to prevent the cap from falling into the coverage area. The chain 38 is secured to the inside of the cap, and the cap is configured to hold the length of the chain when the cap is mounted onto the nozzle. When disengaged from the nozzle, the cap falls away from the nozzle and hangs from the end of the chain, and the chain hangs next to a frame arm and out of the way of the fire-fighting fluid discharged from the nozzle. More preferably, the link member 34 and its bends is configured such that it maintains a substantially fixed orientation with respect to the nozzle and its axis when disposed about the nozzle 10 such that the chain 38 is maintained substantially adjacent the frame arms 15 and out of the way of the fluid discharge when the nozzle operates. Further details regarding the protective cap and its attachment mechanism are provided paragraph [0036], FIGS. 9A-9G and Exhibit 1 of U.S. Provisional Patent Application No. 61/801,384, each of which is specifically incorporated by reference.

The nozzle can have various configurations for mounting the nozzle to the wall and for the engagement surfaces of the outer and inner base members. With reference to FIG. 5A, the outer base member 11a can have an outer surface with a flange 23 that can be welded to the wall 19. In an alternative embodiment, the outer base member 11a can be secured to the wall with a clip connecting the wall to the outer base member. The inlet end of the base member 11a can be welded to the fire-fighting fluid supply system, and the outlet of the outer base member can provide a simplified port with a low-profile relative to the wall and no structure for supporting a cap. Alternatively, the port can be sized to support a cap 22 that is slid over an edge 35 protruding past the wall once the outer base member is installed on the wall. The inner base member 11b can be screwed into the outer base member with threading and a inner base member can have an edge that overlaps the port so as to hide the port when assembled. The engagement between the inner and outer base members can also include a seal that is inserted at the base of the threading on the inner base member.

The outer base member 11a can be configured to control the depth at which the inner base member 11b is inserted into the outer base member. For example, as the inner base member 11b is inserted into the port 20, the inner base member 11b is screwed in until reaching a desired depth, or a desire extension distance from the wall 19. Alternatively or in addition to, the nozzle 10 can be configured to provide a recessed arrangement. For example, the outer base member 11a can provide a port 20 that is sufficiently large to receive the frame arms 15 of the inner base member 11b.

The preferred nozzle 10 and its outer base member and flange can be fixed to the wall surface by, for example welding. Alternatively, as seen in the preferred embodiment illustrated in FIG. 5A, the outer base 11a is preferably secured to a ceiling or wall 19 by compression between a flange 23 extending from the downstream end of the base and a nut 24 threaded onto the base from the upstream end that, when turned, brings the nut and flange closer together until compressing an edge of the ceiling or wall. The base upstream end is connected to the supply system with a weld or a pipe fitting. The downstream end of the base includes a circumferential inner edge that extends downstream, which is sized to receive a cap that fits inside of the downstream outlet of the base. The cap is preferably a cylinder with an open end that mates with the downstream outlet and an opposing closed end that is closed with a hemispherical wall. More preferably, the hemispherical wall of the cap has a centrally-located flattened wall. The interior of the cap provides a connector that holds a chain at one end, with the other end of the chain extending to a clip. Preferably, the connector is a rivet or screw extending through the flattened and hemispherical wall of the cap, with an exterior end of the rivet or screw extending slightly from the exterior of the cap and an interior end that engages the chain. The clip preferably has a planar body with two perpendicular walls that extend from opposing edges of the clip. The perpendicular wall sit on opposing sides of a hole passing through the clip.

Figure 4:
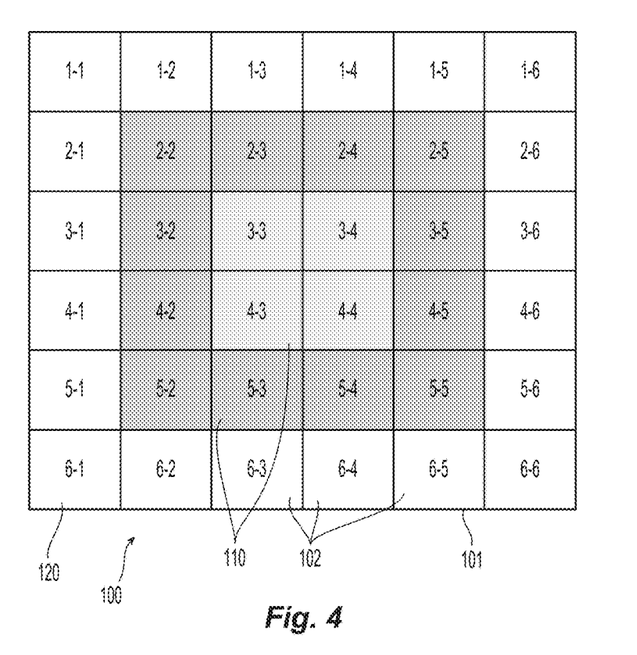
FIG. 4 is a schematic of a preferred embodiment of a layout of a coverage area.

The preferred embodiment proves a distribution that the inventor has discovered is advantageous for compliance with the requirements of the FM Approvals LLC standard entitled "Approval Standard for Water Mist Systems," Class Number 5560, November 2012 and, in particular, for compliance with Appendix J of the FM standard, which is attached as Exhibit 2 to U.S. Provisional Patent Application No. 61/801,384, which is specifically incorporated by reference. In particular, the preferred embodiment provides a particular distribution to an area directly below the nozzle. The distribution is quantified in various manners. The inventor has discovered that a nozzle that provides a particular percentage of the total flow to certain area below the nozzle and a particular densities to different portions to certain areas below the sprinkler are advantageous. Referring to FIG. 4, the area 100 is preferably a coverage area of 36 square feet in the form of a square 101 with sides of 6 feet. Each square foot 102 within the square coverage area 101 is identified by correlation to the six feet along each side. For example, the square feet 102 along one side designated of the coverage area are designated: 1-1, 1-2, 1-3, 1-4, 1-5, and 1-6; the four square feet at the center of the coverage area are designated: 3-3, 3-4, 4-3, 4-4; the twelve square feet around the four square feet at the center of the coverage area are designated: 2-2, 2-3, 2-4, 2-5, 3-2, 3-5, 4-2, 4-5, 5-2, 5-3, 5-4, 5-5. Thus, the four square feet at the center of the coverage area and the twelve square feet around the four square feet at the center of the coverage area define a first area 110 of 16 square feet. Accordingly, the 16 square feet are defined by the square feet designated as: 2-2, 2-3, 2-4, 2-5, 3-2, 3-3, 3-4, 3-5, 4-2, 4-3, 4-4, 4-5, 5-2, 5-3, 5-4, and 5-5. The square feet circumscribing the first area define a second area 120 of 20 square feet and are defined by the square feet along each side of the coverage area are designated: 1-1, 1-2, 1-3, 1-4, 1-5, 1-6, 2-1, 3-1, 4-1, 5-1, 6-1, 6-2, 6-3, 6-4, 6-5, 6-6, 5-6, 4-6, 3-6, and 2-6.

The preferred embodiments of the nozzle provide a particular percentage of the total flow to the coverage area below when the nozzles is approximately 54 inches above the coverage area and provided with water at about a 170 psi pressure for 10 minutes of flow. The preferred embodiments of the nozzle, preferably, provide a percentage of flow to the first area 110 of the coverage area of about 60% to 70% of the total flow to the coverage area and a percentage of flow the second area 120 of the coverage area of about 40% to 30% of the total flow to the coverage area. More preferably, the preferred embodiments of the nozzle, preferably, provide a percentage of flow to the first area 110 of the coverage area of about 65% of the total flow to the coverage area 100 and a percentage of flow to the second area 120 of the coverage area 100 of about 35% of the total flow to the coverage area. Thus, the 16 square feet are defined by the square feet designated as: 2-2, 2-3, 2-4, 2-5, 3-2, 3-3, 3-4, 3-5, 4-2, 4-3, 4-4, 4-5, 5-2, 5-3, 5-4, and 5-5 that form the first area of the coverage area receive as a percentage of flow 60% to 70% of the total flow to the coverage area, and, more preferably receive as a percentage flow about 65% of the total flow to the coverage area, and the 20 square feet defined by the square feet along each side of the coverage area are designated: 1-1, 1-2, 1-3,1-4, 1-5, 1-6, 2-1, 3-1, 4-1, 5-1, 6-1, 6-2, 6-3, 6-4, 6-5, 6-6, 5-6, 4-6, 3-6, and 2-6 that form the second area receive about 40% to 30% of the total flow to the coverage area, more preferably, the preferred embodiments of the nozzle, preferably, and, more preferably receive as percentage of flow about 35% of the total flow to the coverage area.

In addition to a preferred range of the percentage of flow to each of the first area and the second area, the preferred embodiments of the nozzles also provide a particular density to the particular sections of the coverage. The preferred embodiments of the nozzles provide a specified minimum density in gallons per minute to four particular sections in the coverage area. The four sections being (1) the total coverage area, (2) the first area of the coverage area, (3) the second area of the coverage area, and (4) each square for the first area of the coverage area. The four area have a respective distribution value to define four distribution values.

The first section, total coverage area, preferably has a first distribution value of a density of at least 0.080 gallons per minute per square foot of the coverage area. That is, total average flow in gallons per minute to the entire coverage area is a desired minimum of at least 0.080 gallons per minute per square foot. More preferably, the first distribution value is a density of at least 0.090 gallons per minute per square foot to the coverage area.

The second section, the first area of the coverage area, has a second distribution value of a density of at least 0.120 gallons per minute per square foot to the first area of the coverage area. That is, total average flow in gallons per minute to the entire first area of the coverage area is a desired minimum of at least 0.120 gallons per minute per square foot. More preferably, the second distribution value is a density of at least 0.130 gallons per minute per square foot to the first area of the coverage area. That, is the average density to 16 square feet are defined by the square feet designated as: 2-2, 2-3, 2-4, 2-5, 3-2, 3-3, 3-4, 3-5, 4-2, 4-3, 4-4, 4-5, 5-2, 5-3, 5-4, and 5-5 that form the first area of the coverage area receive at least 0.120 gallons per minute per square foot, and preferably, is at least 0.130 gallons per minute per square foot.

The third section, the second area of the coverage area, has a third distribution value of a density of at least 0.040 gallons per minute per square foot to the second area of the coverage area. That is, total average flow in gallons per minute to the entire second area of the coverage area is a desired minimum of at least 0.040 gallons per minute per square foot. More preferably, the third distribution value is a density of at least 0.050 gallons per minute per square foot to the second area of the coverage area. That, is the average density to the 20 square feet defined by the square feet along each side of the coverage area, which are designated as: 1-1, 1-2, 1-3, 1-4, 1-5, 1-6, 2-1, 3-1, 4-1, 5-1, 6-1, 6-2, 6-3, 6-4, 6-5, 6-6, 5-6, 4-6, 3-6, and 2-6 that form the second area, receive at least 0.040 gallons per minute per square foot, and preferably, is at least 0.050 gallons per minute per square foot.

The fourth section, each square foot of the first area of the coverage area, has a fourth distribution value of a density of at least 0.080 gallons per minute per square foot to each of the square feet in the first area of the coverage area. That is, total average flow in gallons per minute to the each one of the square feet in the entire first area of the coverage area is a desired minimum of at least 0.080 gallons per minute per square foot. That, is the average density to each of the 16 square feet that are defined by the square feet designated as: 2-2, 2-3, 2-4, 2-5, 3-2, 3-3, 3-4, 3-5, 4-2, 4-3, 4-4, 4-5, 5-2, 5-3, 5-4, and 5-5 that form the first area of the coverage area receive at least 0.080 gallons per minute per square foot.

Figure 6:
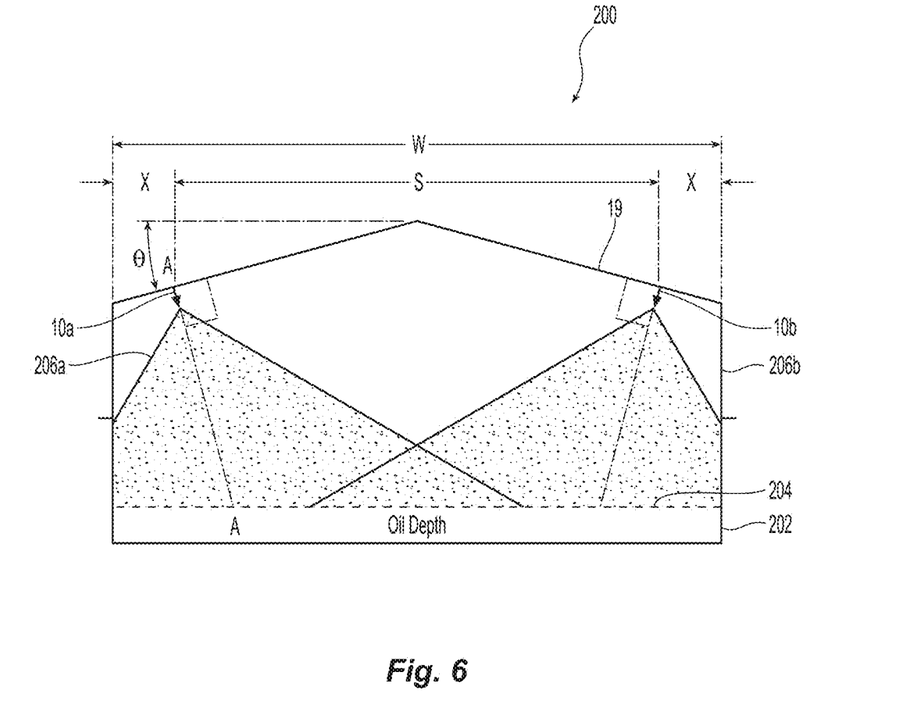
FIG. 6 is a schematic illustration of a preferred nozzle installation and operation in an industrial oil cooker.

The particular distribution defined by the preferred embodiment of the nozzles based on percentage of flow to the first and second area of the coverage area and the four distribution values to the four sections of the coverage area provide for a distribution believed to be advantageous for the protection from fires in oil of industrial fryers. Schematically shown in FIG. 6 is an industrial oil cooker 200 having a pan 202 containing oil to a depth defining an oil surface 204. The innovative distribution pattern provides for nozzle installation options and flexibility for industrial oil fryers including fryers having a hood at a fixed distance from the surface of the oil and/or more preferably an angled hood wall or surface 19. As used herein, an "angled hood" wall or surface is a surface of a hood that is at an angle greater than zero with respect to a plane parallel to the oil surface. The preferred nozzles 10 and their fluid distribution patterns allows for the nozzles to protect an oil surface from various fixed heights and/or locations. Accordingly, the nozzle can be installed in various hoods to protect the oil surface and the nozzle can be mounted directly to the hood or angled with respect to the hood depending on the various parameters, such as the hood angle and/or supply piping options and connection availability.

The nozzle distribution pattern provides an effective spray angle for the nozzle that allows for appropriate coverage of the oil surface 204. The spray angle of the nozzle 10 is preferably determined at locating the second area of the coverage area on the oil surface when the nozzle axis is centered over and perpendicular to oil surface to be protected. The effective spray angle can vary for various preferred embodiments of the nozzle and can depend on the installation height of the nozzle over the oil surface. The effective spray angle allows for the nozzle to be installed at various angles to the oil surface and various distances from the edges of the portion of the oil surface to be protected. Thus, in one preferred aspect of the industrial oil cooker, the nozzle 10 can be installed with its nozzle axis A-A perpendicular to the angled hood surface 19 of the oil cooker and oblique with respect to the oil surface. A nozzle 10 of the preferred embodiments can protect an area in an oil surface lateral from a first side-wall to a second side-wall of the oil cooker. The nozzle 10 can be located laterally a side-wall 206a, 206b of the oil cooker at a lateral distance X. The area protected by a preferred installed nozzle can, in some embodiments, be the entire lateral width W of an oil pan from side-wall 206a to side-wall 206b. Or, in other embodiments, a portion of the entire lateral width W of an oil pan from side-wall to side-wall 206a, 206b. In such embodiments, multiple nozzles, 10a, 10b preferably disposed on a common plane can protect equal portions of the entire lateral width W of the oil surface across the entire width of a of an oil pan from side-wall to side-wall. Because of the distribution pattern the nozzle also protects a distance along the lateral length of the oil surface. The protected lateral width W and length (perpendicular to the width W) of the protected oil surface, preferably form a square area such that the nozzle spaced from one or more nozzles at a distance S, respectively along the lateral W protects any desired width and length oil pan, in particular, an oil pan with a generally rectangular configuration. For example, if the lateral width W of the rectangular oil pan is such that it requires two pair nozzles 10a, 10b to protect the oil surface 204, multiple pairs of nozzles 10a, 10b can be spaced along the lateral length of the oil surface to protect the entire oil surface. Because of the effective spray angle of the preferred embodiments of the nozzle, an oil surface of any lateral length can be protected with the appropriate number of nozzles spaced along the lateral length of the oil surface. While the oil surface to be protected is preferably rectangular and suitable surface configuration can be protected.

The preferred nozzle embodiments provides a method of protecting an industrial oil cooker that includes spacing one or more nozzles from the side wall of the oil pan defining the boundaries of the oil surface. The preferred method includes installation of the nozzles on an angled hood surface with the nozzle axis perpendicular to the angled surface.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire protection nozzle assembly comprising:
   a base defining an inlet and an outlet along an axis, the base having an orifice, the orifice having an inlet diameter and an outlet diameter, the outlet diameter being greater than the inlet diameter, the orifice defining a K-factor of less than 1.0 $gpm/psi^{1/2}$; and
   a diffuser aligned with the orifice;
   a link member disposed about the base such that the link member remains in a fixed orientation with respect to the axis;
   a protective cap engaged with the base to protect the nozzle assembly; and
   a chain coupling the protective cap to the link member.

2. The fire protection nozzle assembly of claim 1, wherein the link member is an annular member having an inner diameter and an outer diameter, the inner diameter being sized to slide the annular member over an external thread of the base.

3. The fire protection nozzle assembly of claim 2, wherein the link member includes a first portion formed so as to prevent rotation of the annular member about the base and a second portion to support the chain.

4. The fire protection nozzle assembly of claim 3, wherein the first portion of the link member fixes the link member in the fixed orientation about the base such that the chain is maintained out of the way of fluid discharge from the outlet when the nozzle assembly operates.

5. The fire protection nozzle assembly of claim 1, wherein the base includes two frame arms disposed about the outlet which converge at a support disposed along the central axis to place the diffuser in position to face the outlet, the fixed orientation of the link member being such that the chain is maintained adjacent the frame arms when the nozzle assembly operates.

\* \* \* \* \*